United States Patent

Bessa et al.

(10) Patent No.: US 8,604,753 B2
(45) Date of Patent: *Dec. 10, 2013

(54) METHOD OF DISTRIBUTING TO A USER A REMEDY FOR INADEQUATE BATTERY LIFE IN A HANDHELD DEVICE

(75) Inventors: Jerry S. Bessa, Ojai, CA (US); Martin D. Cox, Westlake Village, CA (US); Donald K. Moore, Thousand Oaks, CA (US)

(73) Assignee: iPowerUp, Inc, Ojai, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 13/244,419

(22) Filed: Sep. 24, 2011

(65) Prior Publication Data

US 2012/0077552 A1 Mar. 29, 2012

Related U.S. Application Data

(63) Continuation of application No. 12/454,108, filed on May 11, 2009, now Pat. No. 8,080,975.

(60) Provisional application No. 61/052,065, filed on May 9, 2008.

(51) Int. Cl.
*H02J 7/00* (2006.01)

(52) U.S. Cl.
USPC ........... 320/114; 320/101; 320/107; 320/115; 361/679.01; 361/679.41

(58) Field of Classification Search
CPC ......................................................... H02J 7/00

USPC .......................................................... 320/114
See application file for complete search history.

(56) References Cited

U.S. PATENT DOCUMENTS

| 6,586,906 B1 * | 7/2003 | Bessa et al. | 320/101 |
| 7,609,512 B2 * | 10/2009 | Richardson et al. | 361/679.41 |
| 2003/0096642 A1 * | 5/2003 | Bessa et al. | 455/573 |

* cited by examiner

*Primary Examiner* — Yalkew Fantu
(74) *Attorney, Agent, or Firm* — Brian S. Boyer; Syndicated Law PC

(57) ABSTRACT

The teachings relate to a method of distributing to a user a system to provide a remedy for inadequate battery life in a handheld device. The system comprises a modular hybrid-charger assembly operably connected to a device holder. The modular hybrid-charger assembly comprises a rechargeable internal battery connected to a port operable to function as a connection to a portable electronic device, a power management engine embodied in a computer readable medium, and a solar energy source. The device holder comprises a framework operable to receive, hold, and release the portable electronic device; and an alignment mechanism that facilitates a mating of the portable electronic device with the hybrid-charger assembly. The modular hybrid-charger assembly can comprise a form factor that is interchangeable and operable with each of several different device holder form factors.

20 Claims, 7 Drawing Sheets

METHOD OF DISTRIBUTING TO A USER A REMEDY FOR INADEQUATE BATTERY LIFE IN A HANDHELD DEVICE

CROSS-REFERENCE TO RELATED APPLICATIONS

This application is a continuation of U.S. application Ser. No. 12/454,108, filed May 11, 2009, and claims the benefit of U.S. Provisional Application No. 61/052,065, filed May 9, 2008, each application of which is hereby incorporated herein by reference in its entirety.

BACKGROUND

1. Field of the Invention

The teachings generally relate to a wearable, portable docking station having a charging mechanism for a portable electronic device.

2. Description of the Related Art

A longstanding painpoint of the mobile electronic device industry is inadequate battery life. Battery technology has not kept pace with the power-hungry applications being added to smartphones, for example. The 3G cellular market is growing at a high rate and will reach 1 billion units by 2012. There are, however, over 3.5 billion cell phone customers worldwide, and it is expected that the five-billionth mobile subscription will be signed during the final months of 2011, at which time the worldwide penetration of mobile devices will be in excess of 70%. APPLE alone has its own major market in that it expects to have 10 million iPhones in service by the end of 2009. Accordingly, the market opportunity for a solution to inadequate battery life is very large—the cell phone accessory market, for example, currently exceeds $70 billion, and in a survey of 4000 cell phone users, battery life was the primary concern.

The painpoint is increasing every day with the increase in the use of smartphones having multiple advanced features that require the use of additional battery energy. The use of mobile video is becoming much higher, in that 35% of consumers are using mobile video today, and this is expected to grow to over 55% in 2010. These advanced features are 3-5× more power-intensive than talking, and consumers have found that, after limited use, they are out of power!

Until now, there has no suitable remedy to this painpoint. Previously, one remedy was that you could get a portable power-pack to plug into your device to extend battery use, but these are separate units that are cumbersome and must be tethered to your device and carried separately. You would typically do this when you were out of power, or you would carry the power-pack as an emergency backup. However, as an emergency backup, it would likely discharge and lose power, such that you may not still have the charge reservoir that you needed. As another remedy, a user could simply carry a spare battery, but this battery will also likely discharge over time. In addition, the carrying of a spare battery can be hazardous if worn on, or carried, by the user due to short circuiting of the spare battery on the user's person due to contacting with spare change, etc. Moreover, the widespread use of APPLE products, for example the IPHONE or IPOD, has resulted in a widespread use of a device that does not have a replaceable battery. These devices require recharging and cannot be supported by a spare battery and, thus, would benefit highly from the present teachings.

Accordingly, the present teachings are disruptive in that they provide a significant lifestyle change. Imagine having the ability to extensively use all the multiple advanced features on your smartphone without a car charger or having to carry a spare battery as a separate component. Imagine being on a 3 hour flight during which you watch a movie for about an hour-and-a-half. You arrive at the airport and use your smartphone GPS to get directions to your first meeting, and then you use your smartphone to give a 20 minute projection presentation. You then use your smartphone to get GPS directions to your second meeting, during which you use your smartphone to take a 10 minute film of a manufacturing problem. You participate in a third meeting as a 15 minute video conference call on your smartphone. You go to lunch, check and respond to messages on your smartphone by phone calls, emails, and text, and then you watch a 10 minute marketing webinar on your smartphone. After lunch, you use your smartphone to GPS directions to your fourth meeting and present a 10 minute projection proposal, again on your smartphone. You're ready to fly back now, and you browse the net on your smartphone for a location for a dinner engagement location that you need to find after your flight. As you wait for the plane to arrive, you watch a 30 minute TV show on your smartphone. Upon arrival, you still have 3 hours of power remaining on your smartphone! Up until the development of the teachings provided herein, this has not been possible.

The teachings provided herein direct the user to a multi-faceted solution that provides a portable power supply that, among other advantages, (i) can be operable by a user while mobile; (ii) can be worn, as well as carried, by the user; (iii) is an actual docking station that has an untethered power connection; (iv) has an external power connection for at least a second device, such as a BLUETOOTH headset; (v) has multi-charging capabilities with ports compatible with AC, DC, and USB charging; (vi) has untethered solar charging ability; (vii) has a mechanism to position the solar panel for optimal insolation; (viii) has a mechanism to position the graphical user interface for ease of viewing portably; (ix) has modular components, such that the charging mechanism is interchangeable with support casings having alternate form factors, thus reducing manufacturing costs and increasing customer use; (x) has a charge delivery rate that is at least about 25% higher than that of current USB chargers; (xii) has up to about 95% efficiency in charge transfer to a portable electronic device; (xiii) has a power management function to optimize power use; (xiv) has a memory management function to download critical or labeled data from a portable electronic device and transfer the data to an external computer readable medium using a flash memory and a BLUETOOTH chip; and, moreover, (xv) has the ability to produce power off-the-grid, such that the power supply can function even during emergency power outages due to severe climatic conditions, earthquakes, floods, hurricanes, and the like.

SUMMARY

The teachings described herein generally relate to a power supply that can be used to carry, charge, and power a portable electronic device. In some embodiments, the power supply can be a portable and universal hybrid-charging apparatus for a portable electronic device comprising a modular hybrid-charger assembly operably connected to a device holder. In some embodiments, the modular hybrid-charger assembly comprises (i) a rechargeable internal battery connected to a port operable to function as a tetherless connection to a portable electronic device; (ii) a power management engine embodied in a computer readable medium and operable to identify power input to the hybrid-charger assembly, set an input current limit to the charger assembly, detect the status of the internal battery, provide charge where required, or a combination thereof; and (iii) an untethered solar energy source. In some embodiments, the device holder comprises (iv) a framework operable to receive, hold, and release the portable electronic device; and (v) an alignment mechanism that facilitates a mating of the portable electronic device with the hybrid-charger assembly by aligning a connector port of the portable electronic device with a complementary connector port of the hybrid-charger assembly on a translational platform of the hybrid charger assembly and then translating the portable electronic device on the translational platform to mate the connector port of the hybrid charger assembly with the complementary connector port of the portable electronic device. In these embodiments, the modular hybrid-charger assembly comprises a form factor that is interchangeable and operable with each of several different device holder form factors. And, in these embodiments, and the portable and universal hybrid-charging apparatus can be operable by a user while mobile.

In the embodiments taught herein, the complementary connector port can be adjustable by the user to alternate positions to align and mate with alternate portable electronic devices having alternate connector port positions. In some embodiments, the device holder comprises a cassette mechanism that receives and guides the portable electronic device to the alignment mechanism; and the alignment mechanism comprises a compressible platform that (i) contacts the port side of the portable electronic device, (ii) aligns the connector port of the portable electronic device with the complementary connector port of the hybrid charger assembly while in an uncompressed state, and (iii) mates the connector port of the portable electronic device with the complementary connector port of the hybrid charger assembly while in a compressed state.

In the embodiments taught herein, the power supply can have the function of trickle-charging the portable electronic device between or during uses of the portable electronic device, such that the charging mechanism (i) functions to maintain a full or substantially full charge between or during uses of the portable electronic device and (ii) has a greater efficiency in transfer of charge to the portable electronic device than a traditional charging mechanism charging from a low charge.

In the embodiments taught herein, the power supply can have up to about 95% efficiency in transfer of charge to the portable electronic device and, in some embodiments, it has a charge delivery rate to the portable electronic device that is at least about 25% higher than that of a universal serial bus (USB) charger. In some embodiments, the power supply can have a power management engine on a computer readable medium and operable to identify power input, set an input current limit, detect battery status, provide charge where required, or a combination thereof. In some embodiments, the power supply can further comprise an external port to serve as an external power supply for an external portable electronic device.

In the embodiments taught herein that use solar energy, the solar energy source can be an untethered solar panel that recharges the battery with a charge to be delivered to the portable electronic device. In some embodiments, the solar panel can recharge the battery with a charge to be delivered to the portable electronic device, wherein, in some embodiments, the battery has a power ranging from about 1150 mAh to about 2300 mAh. And, the solar panel can be adjustable in position to align the solar panel with a light source and optimize an incidence angle of light to increase a solar charging rate. In some embodiments, the power supplies can further comprise a belt clip, wherein the belt clip is adjustable in position to allow for repositioning of the power supply, while on or off of the user, for various reasons. The belt clip can be used, for example, to prop the docking station in a stationary position while off of the user to optimize the incidence angle of light to increase a solar charging rate. In some embodiments, the belt clip is adjustable in position to prop the docking station in a stationary position while off of the user to allow the user to visualize a graphical user interface on the portable electronic device. The power supplies discussed herein can all be used in a similar fashion.

In embodiments taught herein, the portable electronic device can comprise a handheld data processing system selected from the group consisting of a cellular telephone, a personal digital assistant, a microcomputer, an entertainment gaming system, a music playing system, a video playing system, a video recording device, a digital image recording device, a global positioning system, a digital book reader, a personal media device, or a combination thereof. And, in some embodiments, the portable electronic device comprises a smartphone.

Likewise, in embodiments taught herein, the portable electronic device can also comprise a laptop data processing system selected from the group consisting of a computer, an entertainment gaming system, a music playing system, a video playing system, or a combination thereof. And, in some embodiments, the portable electronic device comprises a mini-computer or a micro-computer.

The embodiments taught herein can also include a memory management engine having a flash memory and a BLUETOOTH chip, wherein the memory management engine functions to (i) download non-critical or labeled data from the portable electronic device and (ii) transfer the data to a computer readable medium that is wireless external to the docking station.

The present teaching is also directed to a portable docking station having a tetherless hybrid-charging mechanism for charging a portable electronic device. In some embodiments, the portable docking station is carried by a user as a device for storing, transporting, or charging the portable electronic device portably by the user. Moreover, the tetherless charging mechanism comprises a hybrid-charging system having a rechargeable battery and a tetherless solar panel for converting light energy into a charge to be delivered to the portable electronic device. The portable docking station can further comprise an alignment mechanism and cassette mechanism as described above. And, in these embodiments, the portable docking station can be operable by a user while mobile.

The teachings herein are also directed to a universal carrier for a portable electronic media device comprising a universal charger assembly operably connected to a device container. In some embodiments, the universal charger assembly comprises (i) a rechargeable internal battery connected to a port operable to function as a tetherless connection to a portable electronic device; and (ii) a power management engine embodied in a computer readable medium and operable to identify power input to the charger assembly, set an input current limit to the charger assembly, detect the status of the internal battery, provide charge where required, or a combination thereof. In some embodiments, the device container comprises (i) a support casing operable to receive, hold, and release the portable electronic device; and (ii) an alignment mechanism that facilitates a mating of the portable electronic device with the universal charger assembly by aligning a connector port of the portable electronic device with a complementary connector port of the hybrid charger assembly on a translational platform of the hybrid charger assembly and then translating the portable electronic device on the translational platform to mate the connector port of the hybrid charger assembly with the complementary connector port of the portable electronic device. In these embodiments, the universal assembly comprises a single form factor that is interchangeable and operable with each of several different device container form factors. The carrier can further comprise an alignment mechanism and cassette mechanism as described above. And, in these embodiments, the universal carrier can be operable by a user while mobile.

The teachings are also directed to a kit comprising (i) the portable and universal hybrid-charging apparatus, the docking station, or the carrier described above; and (ii) and the portable electronic device that has a complementary form factor to the form factor of the device holder or device container described above.

The teachings are also directed to a modular hybrid-charger assembly comprising (i) a rechargeable internal battery connected to a port operable to function as a tetherless connection to a portable electronic device, (ii) a power management engine embodied in a computer readable medium and operable to identify power input to the hybrid-charger assembly, set an input current limit to the charger assembly, detect the status of the internal battery, provide charge where required, or a combination thereof; and (iii) an untethered solar energy source. In some embodiments, the modular hybrid-charger assembly comprises a form factor that is interchangeable and operable with each of several different device holder form factors. And, the teachings are also directed to a device holder or device container comprising a complementary form factor for a desired portable electronic device, wherein the device holder or device container is designed for assembling with the modular hybrid-charger assembly.

The teachings are also directed to a method of charging a portable electronic device. In some embodiments, the method comprises selecting a portable electronic device; obtaining the portable and universal hybrid-charging apparatus, the docking station, or the carrier; placing the portable electronic device in the device holder or device container; and, charging the device with the modular hybrid-charger assembly.

The teachings are also directed to a method of manufacturing a portable and universal hybrid-charging apparatus. In some embodiments, the method comprises selecting portable electronic device; obtaining a device holder or device container that has a complementary form factor for the portable electronic device; obtaining the modular hybrid-charger assembly; and assembling the device holder with the modular hybrid-charger assembly.

DETAILED DESCRIPTION OF THE INVENTION

Figure 1A:
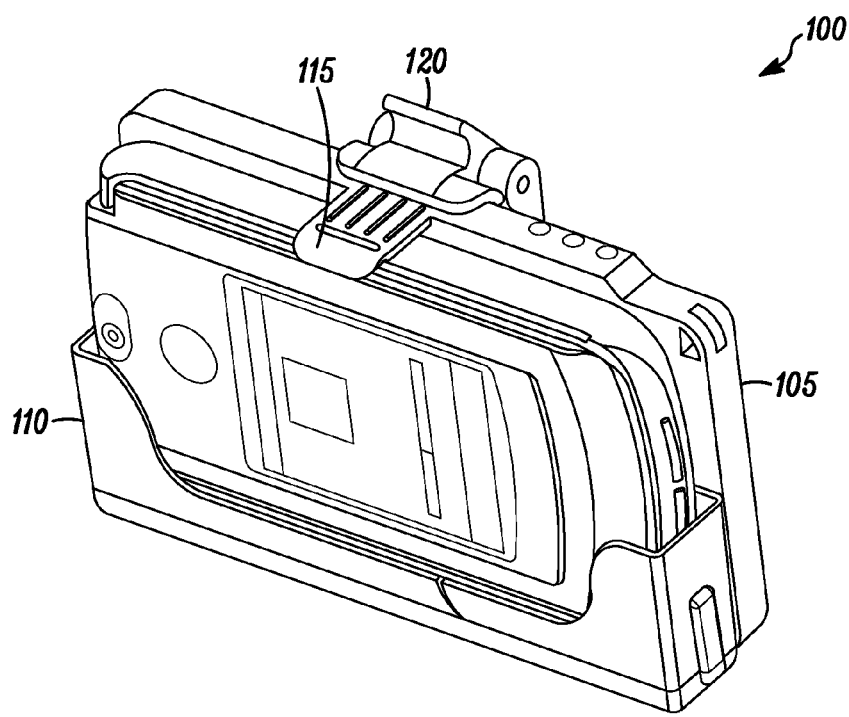
FIGS. 1A and 1B illustrate a portable and universal hybrid-charging apparatus for a portable electronic device according to some embodiments.

The teachings described herein generally relate to a power supply that can be used to carry, charge, and power a portable electronic device. The power supply, for example, can be a wearable, portable hybrid-charging system having a tetherless charging mechanism for a portable electronic device. Or, sometimes the power supply may be a portable system that can be attached to, and carried with, a laptop device. The power supplies taught herein can, in some embodiments, be worn on a belt, clipped to a purse or backpack, hung from a lanyard, or carried as a case, for example.

The power supply can be a portable and universal hybrid-charging apparatus for a portable electronic device comprising a modular hybrid-charger assembly operably connected to a device holder. In some embodiments, the modular hybrid-charger assembly comprises (i) a rechargeable internal battery connected to a port operable to function as a tetherless connection to a portable electronic device; (ii) a power management engine embodied in a computer readable medium and operable to identify power input to the hybrid-charger assembly, set an input current limit to the charger assembly, detect the status of the internal battery, provide charge where required, or a combination thereof; and (iii) an untethered solar energy source. In some embodiments, the device holder comprises (iv) a framework operable to receive, hold, and release the portable electronic device; and (v) an alignment mechanism.

The alignment mechanism facilitates a mating of the portable electronic device with the hybrid-charger assembly by aligning a connector port of the portable electronic device with a complementary connector port of the hybrid-charger assembly on a translational platform of the hybrid charger assembly and then translating the portable electronic device on the translational platform to mate the connector port of the hybrid charger assembly with the complementary connector port of the portable electronic device. In these embodiments, the modular hybrid-charger assembly comprises a form factor that is interchangeable and operable with each of several different device holder form factors. And, in many embodiments, the power supply can be operable by a user while mobile.

The term "interchangeable" can refer to the ability of the modular hybrid-charger assembly to connect and operate with different device holders. In some embodiments, a single charger assembly can interchange with from about 3 to about 10 different device holder form factors, from about 2 to about 5 different device holder form factors, from about 1 to about 4 different device holder form factors, from about 2 to about 20 different device holder form factors, or any range therein. In some embodiments, there are about 2 different modular hybrid-charger assemblies, each of which can connect and operate with about 3-4 different device holders, having the ability to dock and power about 90% of all smartphones.

The power supplies taught herein can be designed to dock and power any portable electronic device known to one of skill within the scope of the teachings provided herein. Examples include, but are not limited to, the LG VU, the MOTO ROKR E8, the MOTO V8, the MOTO RAZR, the HTC TOUCH, the NOKIA N95, the BLACKBERRY PEARL, and the APPLE IPHONE, to name only a few.

Figure 1B:
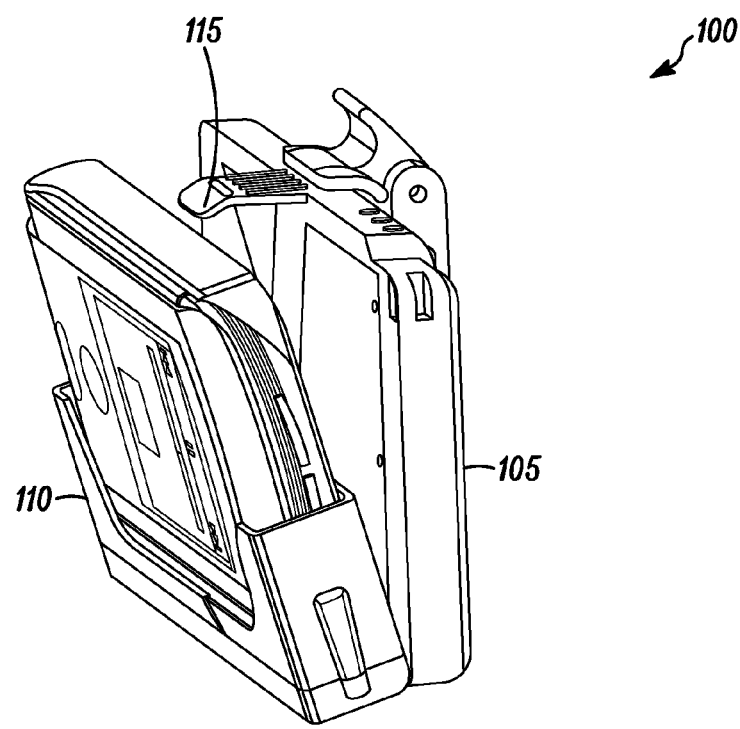

FIGS. 1A and 1B illustrate a portable and universal hybrid-charging apparatus for a portable electronic device according to some embodiments. The major components of apparatus 100 comprise the modular hybrid-charger assembly 105, the device holder 110, latch 115, and reversible belt clip 120. In this embodiment, the device holder 110 has a form factor suitable for the Motorola phone as shown, but the modular hybrid-charger assembly 105 can be easily removed and re-assembled with an alternate device holder should the user desire an alternate portable electronic device having a different form factor. The reversible belt clip 120 can be moved from the modular hybrid-charger assembly 105 side to the device holder 110 side of the apparatus to prop the apparatus at an angle for viewing a graphical interface or for optimizing the incident angle of light on a solar panel, for example, to increase conversion of solar energy to power for the portable electronic device.

Figure 2:
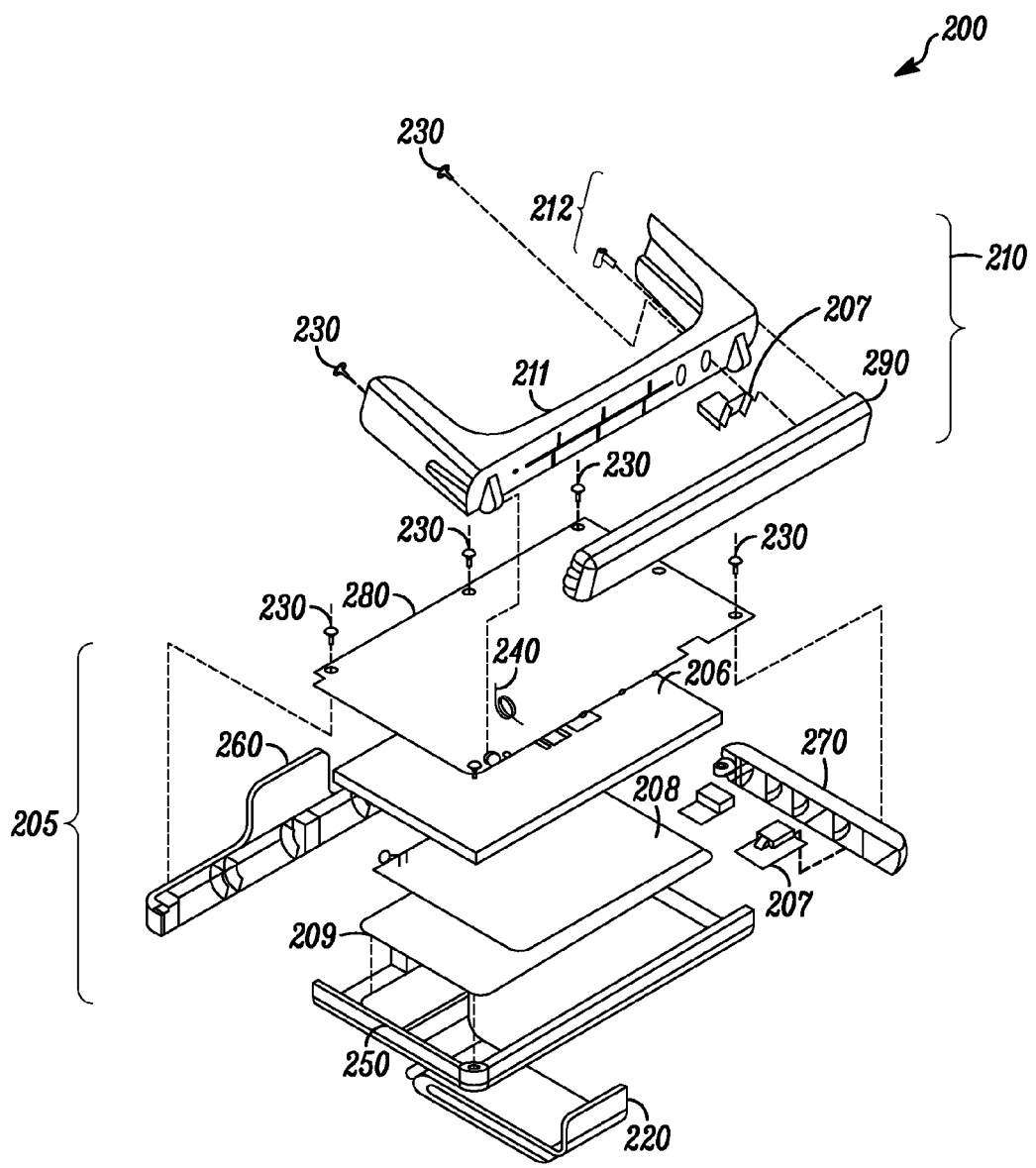
FIG. 2 illustrates an exploded perspective view of a portable and universal hybrid-charging apparatus for a portable electronic device according to some embodiments.

FIG. 2 illustrates an exploded perspective view of a portable and universal hybrid-charging apparatus for a portable electronic device according to some embodiments. The major components of the apparatus 200 comprise the modular hybrid-charger assembly 205, the device holder 210, latch 215, and reversible belt clip 220. The modular hybrid-charger assembly 205 comprises a rechargeable internal battery 206 which is connected to ports 207 for routing power and/or data. A power management engine is included in the process-memory function of the printed circuit board 208. The modular hybrid-charger assembly 205 also includes an untethered solar energy source 209. The device holder 210 comprises framework 211, in the form of a cassette tray in this embodiment, and alignment mechanism 212, which is in the form of phone guide structures in this embodiment. Fasteners 230 hold apparatus components together, and torsion springs 240 facilitate the receiving and releasing of the portable electronic device by the apparatus 200. The modular hybrid-charger assembly further comprises structural components of an enclosure body 250, enclosure top 260, enclosure end 270, enclosure cover 280, and tray cover 290.

The alignment mechanisms to assist in mating the portable electronic device with the portable and universal hybrid-charging apparatus can be a simple translational mechanism having static mechanical guides, or the mechanism can facilitate alignment in stages. In some embodiments, the device holder comprises a cassette mechanism that receives and guides the portable electronic device to the alignment mechanism; and the alignment mechanism comprises a compressible platform that (i) contacts the port side of the portable electronic device, (ii) aligns the connector port of the portable electronic device with the complementary connector port of the hybrid charger assembly while in an uncompressed state, and (iii) mates the connector port of the portable electronic device with the complementary connector port of the hybrid charger assembly while in a compressed state.

Figure 3A:
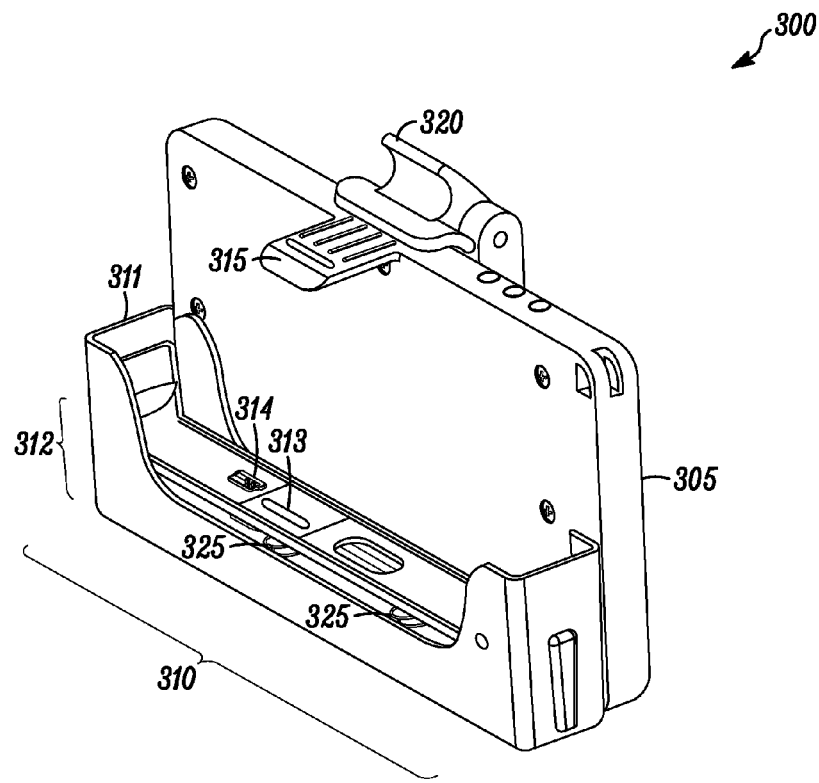
FIGS. 3A, 3B, and 3C illustrate device holders for a portable and universal hybrid-charging apparatus for a portable electronic device according to some embodiments.
Figure 3B:
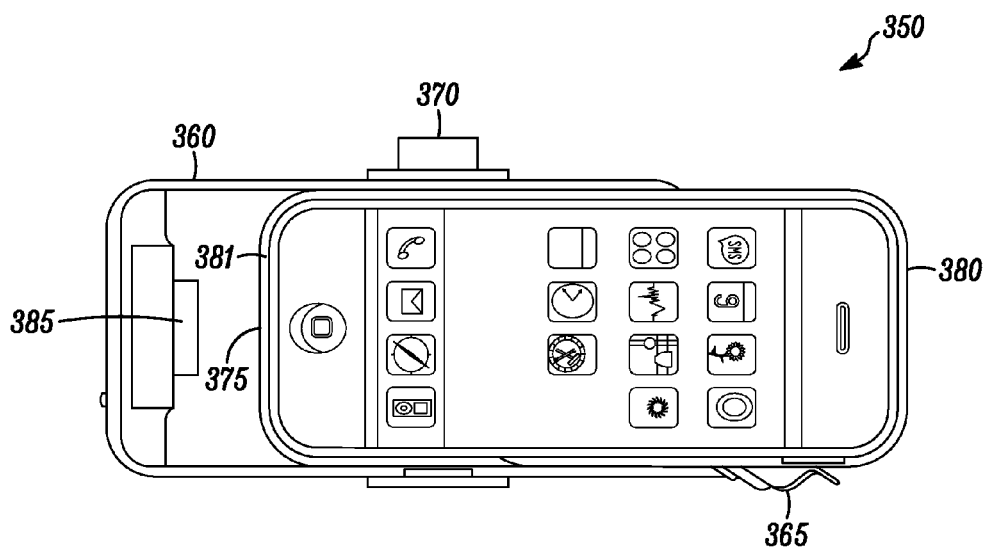
Figure 3C:
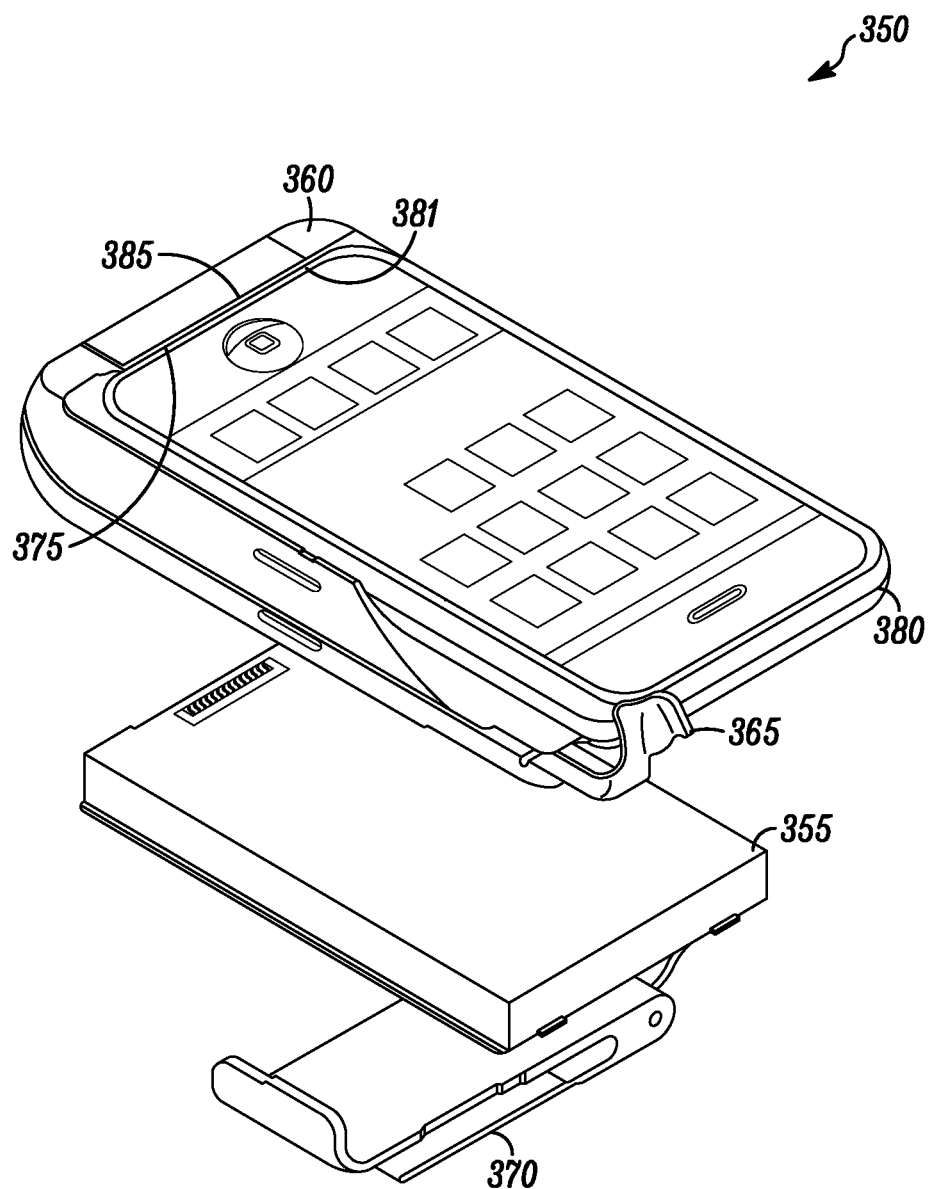

FIGS. 3A and 3B. illustrate alternate device holders having alternate alignment mechanisms for mating alternate portable electronic devices to a portable and universal hybrid-charging apparatus according to some embodiments. FIG. 3A shows the major components of the apparatus 300 having a modular hybrid-charger assembly 305, a device holder 310, latch 315, and reversible belt clip 320. The device holder 310 comprises a cassette mechanism 311 that receives and guides the portable electronic device to the alignment mechanism 312. The alignment mechanism 312 comprises a compressible platform 313 that (i) contacts the port side of the portable electronic device, (ii) aligns the connector port of the portable electronic device with the complementary connector port 314 of the hybrid charger assembly 305 while in an uncompressed state, and (iii) mates the connector port of the portable electronic device with the complementary connector port 314 of the hybrid charger assembly 305 while in a compressed state. Compression springs 325 facilitate the translational movement of the compressible platform 313 from an uncompressed state to a compressed state. FIG. 3B shows apparatus 350 having a modular hybrid-charger 355 (see FIG. 3C), a device holder 360, latch 365, and reversible belt clip 370. The form factors at issue allow connector port 375 of the portable electronic device 380 to easily mate with the complementary connector port 385 of the device holder 360 through a translation movement without the device holder first aligning the port side 381 of the portable electronic device 380 with a compressible platform, such as is shown in FIG. 3A. FIG. 3C shows an exploded view of the major components discussed in FIG. 3B.

In the embodiments taught herein, the complementary connector port can be adjustable by the user. An adjustable complementary connector port can allow the user to alternate positions to align and mate with alternate portable electronic devices having alternate connector port positions.

Figure 4A:
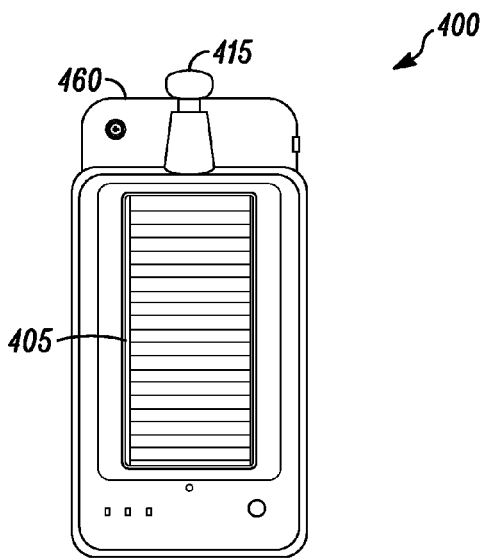
FIGS. 4A, 4B, and 4C illustrate back, side, and front profile views of a portable and universal hybrid-charging apparatus for a portable electronic device according to some embodiments.
Figure 4B:
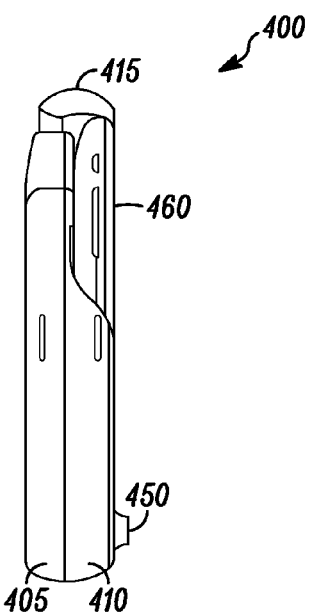
Figure 4C:
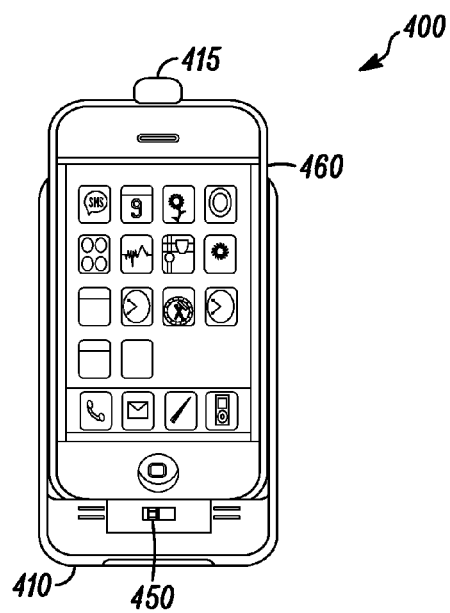

FIGS. 4A, 4B, and 4C illustrate back, side, and front profile views of a portable and universal hybrid-charging apparatus for a portable electronic device according to some embodiments. The major components of the apparatus 400 are a modular hybrid-charger assembly 405, a device holder 410, latch 415. This embodiment does not show a reversible belt clip. However, consistent with the teachings provided, a reversible belt clip can be used in some embodiments. An added feature of this embodiment is an adjustable complementary connector port state selector 450, which allows a user to alternate positions to align and mate the complementary connector port of the charger assembly with alternate portable electronic devices 460 having alternate connector port positions.

As discussed, the systems taught herein can further comprise a belt clip. In some embodiments, the belt clip can be adjustable in position to allow for repositioning of the apparatus, while on or off of the user, for various reasons. The belt clip can be used, for example, to prop an apparatus taught herein in a stationary position while off of the user to optimize the incidence angle of light to increase a solar charging rate. In some embodiments, the belt clip can be adjustable in position to prop an apparatus in a stationary position while off of the user to allow the user to visualize a graphical user interface on the portable electronic device.

Figure 5A:
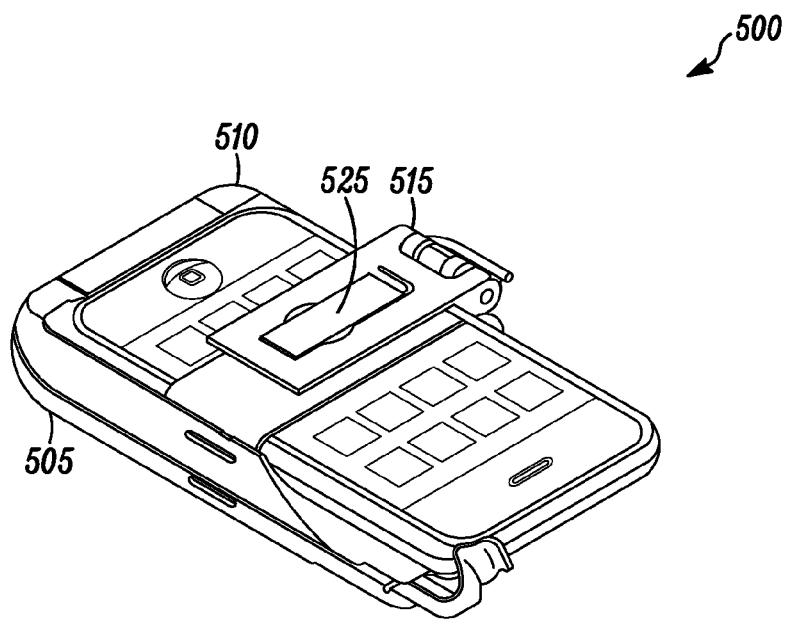
FIG. 5 illustrates the function of an adjustable belt clip for a portable and universal hybrid-charging apparatus for a portable electronic device according to some embodiments.
Figure 5B:
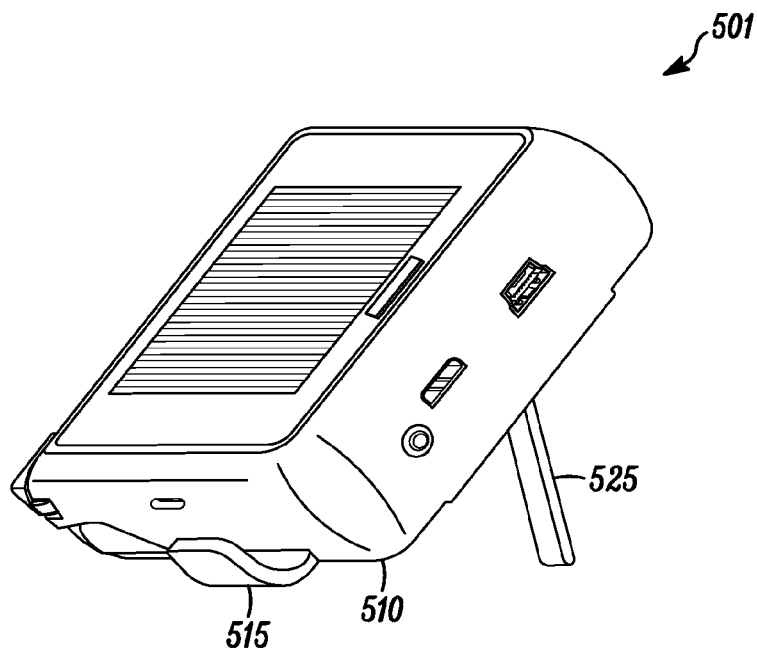

FIG. 5 illustrates the function of an adjustable belt clip for a portable and universal hybrid-charging apparatus for a portable electronic device according to some embodiments. The major components of apparatuses 500,501 are a modular hybrid-charger assembly 505, a device holder 510, and reversible belt clip 520. The major feature of the embodiments shown in FIGS. 5A and 5B is the prop arm 525 making the belt clip adjustable to prop the components in position to optimize solar energy conversion or for a user to view a graphical user interface, for example.

Figure 6:
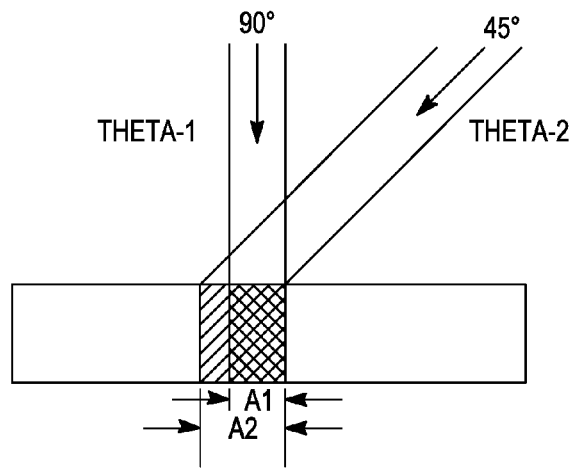
FIG. 6 illustrates the effect of the angle of incidence of incident solar energy on the area of a solar panel that intercepts an incoming beam of solar radiation according to some embodiments.

FIG. 6 illustrates the effect of the angle of incidence of incident solar energy on the area of a solar panel that intercepts an incoming beam of solar radiation according to some embodiments. Yearly changes in the position of the Earth's axis cause the location of the sun to wander 47° across our skies. Changes in the location of the sun have a direct effect on the intensity of solar radiation. The intensity of solar radiation is largely a function of the angle at which the sun's rays strike the Earth's surface. If the Sun is positioned directly overhead or 90° from the horizon, the incoming insolation strikes the surface of the Earth at right angles and is most intense. If the sun is 45° above the horizon, the incoming insolation strikes the Earth's surface at an angle. This causes the rays to be spread out over a larger surface area reducing the intensity of the radiation. FIG. 6 shows the effect of changing the angle of incidence from 90° ($\theta_1$) to 45° ($\theta_2$). As illustrated, the lower sun angle of 45° causes the radiation to be received over a much larger surface area. This surface area $A_2$ of the incident radiation is approximately 40% greater than the surface area $A_1$ of the incident radiation covered by an incident angle of 90°. The lower angle also reduces the intensity of the incoming rays by 30%.

The angle of incidence can be variable and, as such, can be difficult to optimize using the adjustability of the devices taught herein. However, the solar panels are operable at low angles of incidence, and the adjustability of the devices will help to improve charging rates. In some embodiments, the angle of incidence can be adjusted to range from about 10° to about 90°, from about 30° to about 85°, from about 35° to about 85°, from about 40° to about 80°, from about 45° to about 90°, from about 60° to about 90°, from about 80° to about 90°, or any range therein.

The solar energy used in the embodiments taught herein can be solar panels. Examples of solar energy sources include, but are not limited to, photovoltaics and photovoltaic arrays, such as the solar panels. Other alternative energy technologies, such as micro fuel cell, kinetic electric energy, and piezoelectric technologies have been contemplated.

In some embodiments, the solar panel can be a polycrystalline silicon panel providing up to about 90 mA at 5V in a full sun environment. In some embodiments, a CIGS thin film amorphous solar cell technology can be used, particularly where flexibility may be important.

Power can enter the portable and universal hybrid-charging apparatus from a wall charger, a USB port, or other supply, such as a 5V supply through the mini USB socket, for example. Power can also be provided from an untethered solar energy source component, for example. The power sources can be used alone or in combination to provide power to the charging apparatuses taught herein. One of skill will appreciate that an internal microprocessor can be used to determine whether the power is provided by a USB host or a wall charger, for example, and set an input current limit accordingly. One of skill will also appreciate that the power management system can prioritize power to the external system over the internal battery charger system, such that the external system can draw the current it requires to charge and the remaining charge that is entering the charging device can be directed to the internal battery charger without violating the specifications of the USB.

In some embodiments, the charging device operates initially in a constant current mode and switches to a constant voltage mode when the battery of the charging device nears a full charge. Once the battery of the charging device reaches about 4.2V, the charging device switches off of a period of time, e.g. 4 hours, to prevent overcharging. After the period of time the charger will reactive to keep the battery fully charged ("topped-up"). Other standard safety features can be incorporated, as will be appreciated by one of skill.

In some embodiments, the power management system can periodically turn on a boost regulator and supply a 4.85 V to the output mini USB plug and the micro USB socket. The current drawn is monitored by the power management system, and if above a low threshold, it is assumed that a device is connected to one of the power ports, the docked device or an external device. The charging device is enabled and current is provided to one or more power ports.

In some embodiments, the untethered solar panel provides 90 mA current when receiving solar energy. One of skill will appreciate that various solar panels have various configuration and various power outputs. Any suitable solar panel will be operable with the power supplies taught herein. In some embodiments, the power management for the solar panel can operate separately from the remainder of the components to enhance control and efficiency. The solar panel can be connected across the battery, causing a high impedance output of the panel to slave to a voltage just above the battery voltage. Current from the solar panel can flow through a low voltage drop diode and an FET into the battery. The diode can function to control the direction of the control of current and prevents the battery from discharging through the solar panel when sufficient sunlight is not present to charge the battery. And, in some embodiments, the FET can be used to switch-off the solar circuit when the internal batter is fully charged.

In the embodiments taught herein, the power supply can have the function of trickle-charging the portable electronic device between or during uses of the portable electronic device, such that the charging mechanism (i) functions to maintain a full or substantially full charge between or during uses of the portable electronic device and (ii) has a greater efficiency in transfer of charge to the portable electronic device than a traditional charging mechanism charging from a low charge.

In the embodiments taught herein, the power supply can have up to about 95% efficiency in transfer of charge to the portable electronic device and, in some embodiments, it has a charge delivery rate to the portable electronic device that is at least about 25% higher than that of a universal serial bus (USB) charger. The "charge transfer efficiency" can refer to the ratio of (amount of power to the portable electronic device):(amount of power from the charging device). In some embodiments, the charge transfer efficiency can range from about 35% to about 95%, from about 35% to about 85%, from about 35% to about 75%, from about 45% to about 95%, from about 45% to about 85%, from about 45% to about 75%, from about 55% to about 95%, from about 55% to about 90% from about 65% to about 95%, from about 75% to about 95%, from about 80% to about 90%, or any range therein. The "charge delivery rate" can refer to the speed at which current is transferred from the device delivering the charge to the device receiving the charge at a given voltage. In some embodiments, the charge transfer rate of the power supplies taught herein ranges from about 10% to about 25%, from about 15% to about 20%, from about 17% to about 23%, or any range therein, higher than alternatively available charging devices available for use with portable electronic devices.

While not intending to be bound by any theory or mechanism of action, the charge transfer rate and efficiency may be experiencing such surprising results due to the manner in which the charge is being delivered to the device. Current charging mechanisms are cumbersome and not intended for use as a portable docking station, as are the power supplies taught herein. As such, the power supplies taught herein have the ability to immediately dock with the portable electronic device either (i) during use or (ii) between uses. This allows for the power supply to promptly "top-off" the charge to the portable electronic device. As a result, the power supply is delivering the charge to a battery that has a near full charge as opposed to delivering the charge to a battery that is completely or nearly completely discharged. Avoiding the application of higher currents and greater losses is believed to contribute to a more efficient delivery charge and higher charge transfer rate from the power supply to the portable electronic device. Accordingly, the power supplies are a charging mechanism that (i) functions to maintain a full or substantially full charge in the portable electronic device between or during uses and (ii) has a greater efficiency in transfer of charge to the portable electronic device than a traditional charging mechanism charging from a low charge.

The term "full charge" can, in some embodiments, refer to the highest measured battery charge level that is measured during an approximately one hour during standby mode of the portable electronic device after removal of the portable electronic device from the charging mechanism, where standby mode incurs a minimum draw from the device to sustain standby subcircuit device operations. The term "substantially full charge" can, in some embodiments, refer to the highest measured battery charge level that is measured during standby mode for a time period that can range from about 1 hour to about 1 day, from about 1 hour to about 12 hours, from about 2 hours to about 12 hours, from about 2 hours to about 6 hours, or any range therein. In some embodiments, a "substantially full charge" can include a full charge minus an insubstantial current draw from minimal periodic use, such as 30 minutes of talk time, 30 minutes of email, 10 minutes of web browsing, 10 minutes of video streaming, 30 minutes of music streaming, the taking of 4-6 still images, the download of flash memory via BLUETOOTH technology, and the like. In some embodiments, the term "substantially full charge" can refer to a battery that has from about 70% charge to about 95% charge, from about 80% charge to about 95% charge, from about 90% charge to about 95% charge, from about 95% charge to about 99% charge, or any range therein.

In some embodiments, the power supply can have a power management engine on a computer readable medium and operable to identify power input, set an input current limit, detect battery status, control status lights or text/audio status display, provide charge where required, or a combination thereof. The power management engine can function to provide and route charge as required. In some embodiments, the power supply can further comprise an external port to serve as an external power supply for an external portable electronic device.

In the embodiments taught herein that use solar energy, the solar energy source can be an untethered solar panel that recharges the battery with a charge to be delivered to the portable electronic device. In some embodiments, the solar panel can recharge the battery with a charge to be delivered to the portable electronic device. And, in some embodiments, the untethered solar panel can be adjustable in position to align the solar panel with a light source and optimize an incidence angle of light to increase a solar charging rate.

The batteries used in the teachings herein can be any suitable rechargeable batteries know to one of skill to be useful in portable electronic devices, and the battery power can vary. The portable electronic devices can be 5V devices. In some embodiments, the battery has a power ranging from about 1150 mAh to about 2300 mAh, from about 1000 mAh to about 3000 mAh, from about 1300 mAh to about 1800 mAh, from about 1500 mAh to about 2000 mAh, or any range therein. In some embodiments, the battery can be a 2200 mA Li-poly battery, for example. In some embodiments the battery is a lithium ion battery or lithium polymer battery having a nominal voltage of about 3.7V and a charge capacity of about 1400 mAh.

The portable electronic device can be any such device known to one of skill that would be suitable for use with the teachings provided herein. Such devices can have several functions that can be used in separate devices, in single devices, and sometimes in combination. Such functions include, but are not limited to, a still camera, a video camera, an MP3 player, a GPS system, a camcorder, live broadcast, email, web browsing, BLUETOOTH applications, mobile broadband, touch screen user-interface, and the like.

In embodiments taught herein, the portable electronic device can comprise a handheld data processing system selected from the group consisting of a cellular telephone, a personal digital assistant, a microcomputer, an entertainment gaming system, a music playing system, a video playing system, a video recording device, a digital image recording device, a global positioning system, a digital book reader, a personal media device, or a combination thereof. And, in some embodiments, the portable electronic device comprises a smartphone.

Likewise, in embodiments taught herein, the portable electronic device can also comprise a laptop data processing system selected from the group consisting of a computer, an entertainment gaming system, a music playing system, a video playing system, or a combination thereof. And, in some embodiments, the portable electronic device comprises a mini-computer or a micro-computer.

The embodiments taught herein can also include a memory management engine. In these embodiments, the memory management engine can have a flash memory and a BLUETOOTH chip, or a similar RF device known to one of skill, wherein the memory management engine functions to (i) download non-critical or labeled data from the portable electronic device and (ii) transfer the data to a computer readable medium that is wireless external to the docking station.

Figure 7:
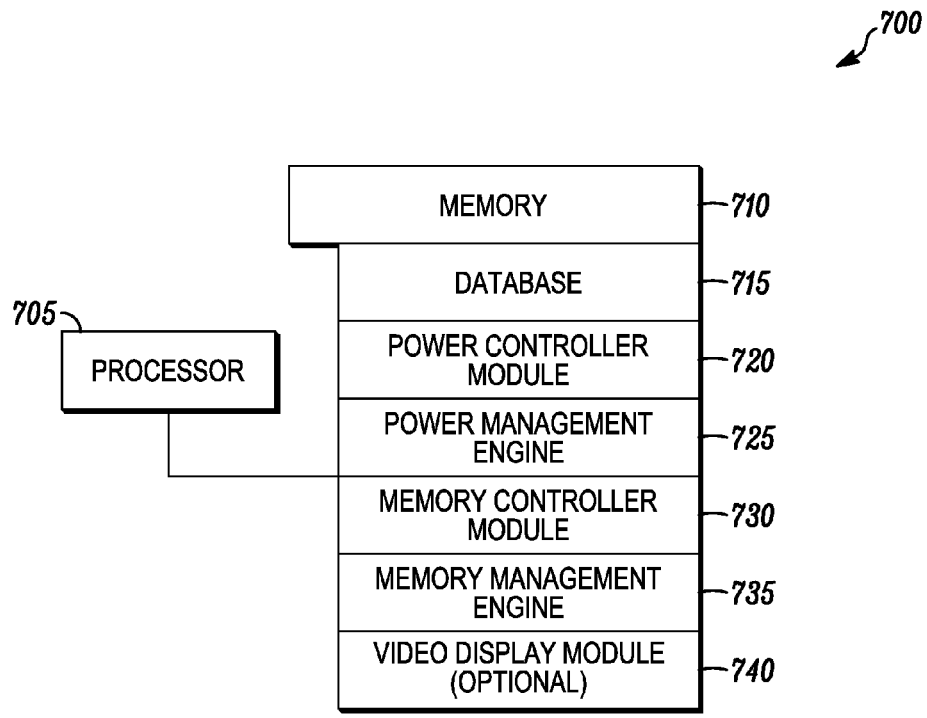
FIG. 7 illustrates a processor-memory diagram to describe the major memory modules processed in a portable and universal hybrid-charging apparatus for a portable electronic device according to some embodiments.

FIG. 7 illustrates a processor-memory diagram to describe the major memory modules processed in a portable and universal hybrid-charging apparatus for a portable electronic device according to some embodiments. The system 700 contains a processor 705 and a memory 710 (that can include non-volatile memory) includes a database 715 embodied in a computer readable medium operable for storage of power data, power controller instructions, and non-critical and tagged-data for memory management. The memory 710 also contains a power controller module 720 embodied in a computer readable medium operable for correlating power data with power management instructions, as well as a power management engine 725 embodied in a computer readable medium operable for executing power management instructions identified through the correlations of power data with power controller controller instructions obtained from the power controller module 720. A memory controller module 730 embodied in a computer readable medium operable to identify non-critical and tagged data is included to work with a memory management engine 735 containing a flash memory and a BLUETOOTH chip or similar RF device known to one of skill. The memory management engine 735 is embodied in a computer readable medium and operable to execute the transfer of such data by (i) downloading non-critical or labeled data from the portable electronic device and (ii) transferring the data to a computer readable medium that is wireless and external to the portable and universal hybrid-charging apparatus. This can occur, in some embodiments, when the apparatus comes in close enough proximity to a device that can detect an RF signal from the BLUETOOTH chip and has the external computer readable media for receiving the transferred data. Optionally, the system includes a video display module 740 to show a written or graphical form of data from the power management and/or memory management.

The present teaching is also directed to a portable docking station having a tetherless hybrid-charging mechanism for charging a portable electronic device. In some embodiments, the portable docking station is carried by a user as a device for storing, transporting, or charging the portable electronic device portably by the user. Moreover, the tetherless charging mechanism comprises a hybrid-charging system having a rechargeable battery and an untethered solar panel for converting light energy into a charge to be delivered to the portable electronic device. The portable docking station can further comprise an alignment mechanism and cassette mechanism as described above.

The teachings herein are also directed to a universal carrier for a portable electronic media device comprising a universal charger assembly operably connected to a device container. In some embodiments, the universal charger assembly comprises (i) a rechargeable internal battery connected to a port operable to function as a tetherless connection to a portable electronic device; and (ii) a power management engine embodied in a computer readable medium and operable to identify power input to the charger assembly, set an input current limit to the charger assembly, detect the status of the internal battery, provide charge where required, or a combination thereof. In some embodiments, the device container comprises (i) a support casing operable to receive, hold, and release the portable electronic device; and (ii) an alignment mechanism that facilitates a mating of the portable electronic device with the universal charger assembly by aligning a connector port of the portable electronic device with a complementary connector port of the hybrid charger assembly on a translational platform of the hybrid charger assembly and then translating the portable electronic device on the translational platform to mate the connector port of the hybrid charger assembly with the complementary connector port of the portable electronic device. In these embodiments, the universal assembly comprises a single form factor that is interchangeable and operable with each of several different device container form factors. The carrier can further comprise an alignment mechanism and cassette mechanism as described above.

The teachings are also directed to a kit comprising (i) the portable and universal hybrid-charging apparatus, the docking station, or the carrier described above; and (ii) and the portable electronic device that has a complementary form factor to the form factor of the device holder or device container described above. In some embodiments, for example, the user can purchase a smartphone kit that also includes the portable and universal hybrid-charging apparatus. In these embodiments, the manufacturer can use the modular hybrid-charging assembly and interchangeably attach it to any of a variety of support casings, device holders, or device containers having a form factor complementary to the smartphone of choice. One of skill will appreciate that this kit concept can be used for any one or any combination of portable electronic devices.

The teachings are also directed to a modular hybrid-charger assembly comprising (i) a rechargeable internal battery connected to a port operable to function as a tetherless connection to a portable electronic device, (ii) a power management engine embodied in a computer readable medium and operable to identify power input to the hybrid-charger assembly, set an input current limit to the charger assembly, detect the status of the internal battery, provide charge where required, or a combination thereof; and (iii) an untethered solar energy source. In some embodiments, the modular hybrid-charger assembly comprises a form factor that is interchangeable and operable with each of several different device holder form factors. And, the teachings are also directed to a device holder or device container comprising a complementary form factor for a desired portable electronic device, wherein the device holder or device container is designed for assembling with the modular hybrid-charger assembly.

The teachings are also directed to a method of charging a portable electronic device. In some embodiments, the method comprises selecting a portable electronic device; obtaining the portable and universal hybrid-charging apparatus, the docking station, or the carrier; placing the portable electronic device in the device holder or device container; and, charging the device with the modular hybrid-charger assembly.

The teachings are also directed to a method of manufacturing a portable and universal hybrid-charging apparatus. In some embodiments, the method comprises selecting portable electronic device; obtaining a device holder or device container that has a complementary form factor for the portable electronic device; obtaining the modular hybrid-charger assembly; and assembling the device holder with the modular hybrid-charger assembly.

EXAMPLE

This example describes a universal hybrid mobile charger, which is an intelligent hybrid mobile docking station for 3G smart/cellphone charging. The charger has AC/DC/USB/SOLAR rapid-charging capabilities that significantly extend basic & features usage of 3G Cell/Smartphones. The functional result is a novel and much needed convenient portable charging in a small, practical, stylish, and wearable package. FIGS. 4A through 4C illustrate an example of the hybrid mobile charger with an APPLE product.

The components of the charger are encapsulated for humidity, shock & vibration resistance. The solar panel is coated for scratch resistance. The dimensions vary according to form factor of the portable electronic device, but a common phone charger will have dimensions of about 4.00" length× 2.25" width×1.13" thickness.

The power from the battery is efficiently transferred to a portable electronic device. When a cell phone is inserted into the universal mobile hybrid charger for storage, use, or transport, the cell phones battery is instantly sensed & monitored and the charger battery automatically transfers rapid power to the phones battery. The charger battery can be pre-charged by AC, DC, USB, or solar, for example, for mobile usage. Rapid AC/DC/USB charging capabilities offers rapid charging time, significant transportable peak power, emergency solar re-charging capability, and is in a convenient accessible attractive mobile package. The charger is designed to provide optimized mobile backup power on demand.

The charger intelligently initiates charging as often and as long as needed to maintain the optimum charge level of the portable electronic device's battery until the charger's stored charge is depleted. The power storage and power transfer from holsters battery to the phone's battery is performed at up to 94% efficiency, and the charger's battery safely transfers to the phones battery a 25% faster rapid charge rate than current USB chargers deliver. The charger automatically adapts to the maximum charge rates set by OEMs circuitry for a safe efficient operation. The available charge in the charger is identifiable by viewing LED lights referred to as the "fuel gauge." The LEDS are located on the back of the device and are activated by pressing a button. The charger's battery capacity can range from 1650-2200 mAh and provide about 8 hours of mobile peak power. The charger battery, when empty, can charge, in some embodiments, to full charge from a wall charger in about 3 hours. The charger can operate in conditions ranging from about 0 C to about 65 C, weighs about 75 g, and about 80% is made from recyclable materials. A valueadd, pocket-size solar accessory pack & dongle is also available for interfacing with the charging device to rapidly solar charge the solar charging device and provide 500 mA's in 1 hour.

The solar array converts solar energy efficiently to an electrical output and generate 100 mA's (avg.) in an AM1 sun environment (sunny day) per hour. The storage battery of the charger is a Li-Polymer battery and collects power by an AC/DC/USB/SOLAR configuration. The charger design incorporates a 45 degree angle for when device is placed in a stationary position directed at the sun to offer maximum "incidence angle of light" for optimized solar charging rates. The charger provides a charging rate of about 100 mA (avg.) per hour in an STC defined irradiance of 1000 W/m$^2$, spectrum AM1.5 @ 25° C. environment (10:00-2:00 sunny day). Outside of the AM1 environment, the charge rate varies per hour with light intensity.

The solar panel can convert 1 hour of direct sunlight into approximately 17-20 minutes of GSM cellular talk time power (dependent upon cell site conditions/location/design of phone/atmospheric conditions) if in a AM1 (sunny day; 100 mAh) environment. The power is generated when the solar panel is exposed to direct, reflected, or ambient sunlight, although maximum performance is usually when the insolation is from direct sunlight having a 90 degree incident angle. The electronics provides optimum loading on the solar cells for varying light intensities and battery power level conditions and when direct, reflected, or ambient light is received, the solar panel generates electrical current that is efficiently stored in the charger battery for transfer to the portable electronic device, such as a smartphone. An additional stand is designed in the reversible clip providing a 45 degree angle for improving incident angle of the sunlight directed at the solar panel for improving the quantity of solar charging.

The power is managed by a power management engine that efficiently and rapidly transfer's stored power to, for example, a smartphone's battery. This operation is performed automatically anytime the phone is inserted into the device for storage or transport. When pre-charged from AC/DC/USB/SOLAR, the charger provides a simultaneous charge to the phone battery until phone's battery is full, or until the phone is removed. If outdoors, the charger can solar charge the charger's battery & discharge to the phones battery simultaneously. Moreover, the charger offers 2 exterior USB2 charging ports that enables use of traditional existing AC/DC/USB chargers and also charges headset accessories or other 5V electronic devices. A charger dongle (cable) is provided to draw peak power from the charger's micro USB2 exterior charging port, thereby offering the consumer additional extended continuous usage of the portable electronic device when it's not in the device. Such usage can be valuable, for example, when video conferencing, watching IPTV, or even full length Movies, as well as when charging other 5V electronic devices.

A slider switch is provided at base of unit for primary internal connector adjustment which aligns mating connectors for use with like models, for example, with APPLE products, the slider can be moved to accomodate either of APPLE'S 3G IPHONE or ITOUCH models. A safety latch is incorporated at the top of the device to secure the phone and is a smooth one handed operation. A phone, for example, can be easily released by simply pressing on the spring loaded latch for retrieval.

It should be appreciated that the methods and displays presented herein are not inherently related to any particular hardware, firmware, device, or other apparatus. Various systems may be used in accordance with the teachings provided herein, or it may prove to be more convenient to construct a more specialized apparatus to perform the intended functions and methods that are the gist of the teachings. The structures that are required, substitutable, substantially similar, or replaceable can be recognized by those having ordinary skill in the art giving the teachings. Various embodiments are possible using the skills and knowledge possessed by one of skill. Accordingly, the terms and examples are illustrative of the concepts only, are not intended to be limiting, and are to serve merely as embodiments that illustrate by way of example and not limitation.

We claim:

1. A method of distributing to a user a remedy for inadequate battery life in a portable electronic device, the method comprising:
    providing the user of the device with a system, the system comprising a portable docking station, the portable docking station having a hybrid-charging mechanism for charging the portable electronic device, wherein:
        the portable docking station is configured for a carrying by the user to function as a device for storing, transporting, or charging the portable electronic device portably by the user;
        the hybrid-charging mechanism comprises a rechargeable battery and a solar panel for converting light energy into a charge to be delivered to the portable electronic device;
        the system includes an alignment mechanism that facilitates a mating of the portable electronic device with the hybrid-charging system by aligning a connector port of the portable electronic device with a connector port of the hybrid-charging system on a platform of the hybrid charger assembly to connect the connector port of the hybrid charger assembly with the connector port of the portable electronic device; and,
    the system is operable by the user while mobile to provide the remedy for the inadequate battery life in the portable electronic device.

2. The method of claim 1, wherein the alignment mechanism comprises a compressible platform that (i) contacts the port side of the portable electronic device, (ii) aligns the connector port of the portable electronic device with the connector port of the hybrid charger system while in an uncompressed state, and (iii) mates the connector port of the portable electronic device with the connector port of the hybrid charger system while in a compressed state.

3. The method of claim 1, wherein the connector port of the docking station is adjustable by the user to alternate positions to align and mate with alternate portable electronic devices having alternate connector port positions.

4. The method of claim 1, further comprising an external port to serve as an external power supply for an external portable electronic device.

5. The method of claim 1, the system having the function of trickle-charging the portable electronic device when docked in the docking station between or during uses of the portable electronic device, such that the charging mechanism (i) functions to maintain a full or substantially full charge between or during uses of the portable electronic device and (ii) has a greater efficiency in transfer of charge to the portable electronic device than a traditional charging mechanism charging from a low charge.

6. The method of claim 1, the system having up to about 95% efficiency in transfer of charge to the portable electronic device.

7. The method of claim 1, the system having a charge delivery rate to the portable electronic device that is at least about 25% higher than that of a universal serial bus (USB) charger.

8. The method of claim 1, wherein the solar panel is adjustable in position to align the solar panel with a light source and optimize an incidence angle of light to increase a solar charging rate.

9. The method of claim 1, the system having a power management engine on a computer readable medium and operable to identify power input, set an input current limit, detect battery status, provide charge where required, or a combination thereof.

10. The method of claim 1, the system further comprising a belt clip, wherein the belt clip is adjustable in position to prop the docking station in a stationary position while off of the user to allow the user to visualize a graphical user interface on the portable electronic device.

11. The method of claim 1, wherein the solar panel is tetherless, and the portable electronic device comprises a handheld data processing system selected from the group consisting of a cellular telephone, a personal digital assistant, a microcomputer, an entertainment gaming system, a music playing system, a video playing system, a video recording device, a digital image recording device, a global positioning system, a digital book reader, a personal media device, or a combination thereof.

12. The method of claim 1, wherein the solar panel is tetherless, and the portable electronic device comprises a smartphone.

13. The method of claim 1, the system further comprising a memory management engine having a flash memory and a means for downloading data to a non-transitory computer readable storage medium that is wireless external to the docking station, wherein the memory management engine functions to (i) download non-critical or labeled data from the portable electronic device and (ii) transfer the data to the non-transitory computer readable storage medium that is wireless external to the docking station.

14. A method of distributing to a user a remedy for inadequate battery life in a smartphone, the method comprising:
providing the user of the phone with a system, the system comprising a portable docking station, the portable docking station having a hybrid-charging mechanism for charging the phone, wherein:
the portable docking station is configured for a carrying by the user to function as a device for storing, transporting, or charging the phone portably by the user;
the hybrid-charging mechanism comprises a rechargeable battery and a solar panel for converting light energy into a charge to be delivered to the phone;
the system includes an alignment mechanism that facilitates a mating of the phone with the hybrid-charging system by aligning a connector port of the phone with a connector port of the hybrid-charging system on a platform of the hybrid charger assembly to connect the connector port of the hybrid charger assembly with the connector port of the phone; and,
the system is operable by the user while mobile to provide the remedy for the inadequate battery life in the phone.

15. The method of claim 14, wherein the solar panel is tetherless, and the phone comprises a handheld data processing system selected from the group consisting of a personal digital assistant, a microcomputer, an entertainment gaming system, a music playing system, a video playing system, a video recording device, a digital image recording device, a global positioning system, a digital book reader, a personal media device, or a combination thereof.

16. The method of claim 14, the system having the function of trickle-charging the phone when docked in the docking station between or during uses of the phone, such that the charging mechanism functions to maintain a full or substantially full charge between or during uses of the phone.

17. A method of distributing to a user a remedy for inadequate battery life in a handheld device having a mobile video application, the method comprising:
providing the user of the device with the system, the system comprising a portable docking station, the portable docking station having a hybrid-charging mechanism for charging the device, wherein:
the portable docking station is configured for a carrying by the user to function as a device for storing, transporting, or charging the device portably by the user;
the hybrid-charging mechanism comprises a rechargeable battery and a solar panel for converting light energy into a charge to be delivered to the device;
the system includes an alignment mechanism that facilitates a mating of the device with the hybrid-charging system by aligning a connector port of the device with a connector port of the hybrid-charging system on a platform of the hybrid charger assembly to connect the connector port of the hybrid charger assembly with the connector port of the device; and,
the system is operable by the user while mobile to provide the remedy for the inadequate battery life in the device.

18. The method of claim 17, wherein the solar panel is tetherless, and the device comprises a handheld data processing system selected from the group consisting of a phone, a personal digital assistant, a microcomputer, an entertainment gaming system, a music playing system, a video playing system, a video recording device, a digital image recording device, a global positioning system, a digital book reader, a personal media device, or a combination thereof.

19. The method of claim 17, the system having the function of trickle-charging the device when docked in the docking station between or during uses of the device, such that the charging mechanism functions to maintain a full or substantially full charge between or during uses of the device.

20. The method of claim 17, the system having up to about 95% efficiency in transfer of charge to the device.

* * * * *